(12) United States Patent
Khawer et al.

(10) Patent No.: US 7,058,029 B2
(45) Date of Patent: Jun. 6, 2006

(54) DYNAMIC POWER CONTROL FOR A TDMA BASED AIR INTERFACE

(75) Inventors: Mohammad Riaz Khawer, Scotch Plains, NJ (US); Padmakumar B. Pillai, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 993 days.

(21) Appl. No.: 10/056,950

(22) Filed: Jan. 25, 2002

(65) Prior Publication Data

US 2003/0142637 A1 Jul. 31, 2003

(51) Int. Cl.
*H04B 7/185* (2006.01)
*H04B 7/212* (2006.01)
*H04J 3/00* (2006.01)
*H04Q 7/20* (2006.01)

(52) U.S. Cl. ............... 370/318; 370/321; 370/337; 370/347; 455/13.4; 455/522

(58) Field of Classification Search ............... None
See application file for complete search history.

(56) References Cited

U.S. PATENT DOCUMENTS

| 6,411,817 B1 * | 6/2002 | Cheng et al. ............... 455/522 |
| 6,529,494 B1 * | 3/2003 | Ostman et al. ............. 370/337 |
| 6,539,010 B1 * | 3/2003 | Hagerman et al. .......... 370/347 |
| 6,725,054 B1 * | 4/2004 | Hwang et al. .............. 455/522 |

* cited by examiner

*Primary Examiner*—Alpus Hsu
*Assistant Examiner*—Lina Yang

(57) ABSTRACT

The method provides power control in transmitting a downlink signal of frame data in a wireless network. Each frame is composed of timeslots, with each timeslot being further composed of quarter symbols. The method includes mapping each quarter symbol to an offset within a frame attenuation buffer, and computing a template for the frame, each step being performed only once. The template is used for filling the attenuation buffer with attenuation values to attenuate the transmit power for the downlink signal. Attenuation values are provided for each quarter symbol in a frame, although a computation is not required for each quarter symbol. The attenuation values are grouped in blocks that are recursively copied into the frame attenuation buffer based on the template. The contents of a filled attenuation buffer are output for use in attenuating the transmit power of the frame.

30 Claims, 9 Drawing Sheets

DYNAMIC POWER CONTROL FOR A TDMA BASED AIR INTERFACE

BACKGROUND OF THE INVENTION

1. Field of the Invention

The present invention relates to wireless communications, and in particular, to a dynamic power control technique used in transmissions between a base transceiver station and one or more mobile stations in a wireless communication system.

2. Description of Related Art

Wireless communication networks use a number of communication schemes, such as frequency division multiple access (FDMA), code division multiple access (CDMA), time division multiple access (TDMA) schemes, and combinations of such schemes. In a TDMA scheme, over a given RF channel, each mobile station (MS) in a cell transmits and receives (to and from the base transceiver station (BTS) audio data and non-audio data packets during dedicated time slices or time slots within an overall TDMA cycle or epoch. Channels of wireless systems have varying numbers of timeslots. For example, from 1 to 8 radio interface timeslots are allocated per TDMA frame in GSM (Global System for Mobile Communication) systems, and 1 to 6 radio interface timeslots in cellular/PCS systems using a North American Dual Mode TDMA interface (hereinafter TDMA IS-136). Timeslots are shared by the active users, and uplink and downlink timeslots are allocated separately. The downlink refers to transmissions from the BTS to one or more MSs, while uplink refers to transmissions received by the BTS. The radio interface resources can be shared dynamically between speech and data services as a function of service load and operator preference. Various radio channel coding schemes are specified to allow bit rates from 9 to more than 150 kbit/s per user.

FIG. 1 illustrates a typical wireless communication network. The wireless network 10 includes a plurality of geographic sub-areas ("cells") 12-1, . . . , 12-i. Each cell 12-1, . . . , 12-i has a corresponding base transceiver station (BTS) 14-1, . . . , 14-i for providing communication service to mobiles located therein, such as mobiles 20-1, . . . , 20j located in cell 12-1. Each of the BTSs 14-1, . . . , 14-i is connected (e.g., via a trunk line) to a mobile telephone switching office (MTSO) 16. The BTS 14-i and the mobiles 20-j communicate with each other using industry-accepted air interfaces such as the TDMA IS-136 interface for Cellular/PCS, Code Division Multiple Access interface (CDMA IS-95), GSM etc. The MTSO 16 manages communications within the network, and serves as an interface between the wireless network and a public switched telephone network (PSTN) 40, for example.

Dynamic power control is an important tool for mitigating co-channel interference, and improving the RF quality for the wireless network. The use of a downlink dynamic power control mechanism or process will allow a higher percentage of users in the wireless network to receive the desired downlink by improving the C/I (Carrier to Interference ratio) than the case of no power control for the same frequency reuse and cell coverage area. Keeping co-channel interference levels low holds the promise that high rate coding schemes can be used over the airlink. The lower interference levels achieved by power control can result in higher airlink throughputs over larger portions of the cell, potentially increasing a cell's data traffic carrying capacity. Effective power control also ensures that timeslots in wireless networks using a TDMA based air interface such as TDMA IS-136, GSM and General Packet Radio Service (GPRS) networks, do not cause unacceptable levels of interference to the users/calls in the co-channel neighboring cells.

Power control "mistakes" in wireless networks have consequences. For example, inadequate-power control may lead to poor voice quality, and dropped calls. These service disruptions are extremely annoying for users and network operators alike. Inadequate power control for mobile stations can cause high BLERs (block error rates) and degradation of uplink signal quality. Power control errors in wireless networks increase packet delays and increase packet re-transmissions due to the bit error rate (BER), resulting in decreased user throughputs. These errors generally cause service degradation rather than wholesale service disruption.

TDMA Downlink Dynamic power control (TDDPC) mechanisms allow a wireless network to adjust the power used by each BTS for transmitting the downlink RF signal. Downlink power control provides an important added benefit: transmit power used by each network BTS can be reduced to levels adequate to achieve proper airlink performance, and no higher. Transmit power can be kept as low as possible without sacrificing airlink throughput, giving users peak airlink performance without unnecessarily draining the base transceiver station's power source.

SUMMARY OF THE INVENTION

The method and apparatus of the invention controls downlink transmit power from a radio of a base transceiver station on at least a per frame basis, and even on a per timeslot basis or per quarter symbol basis. A frame of data, which may be one of a plurality of frames representing one or more calls, for example, is composed of timeslots, with each timeslot being further composed of quarter symbols. The power at which a frame is transmitted in a wireless network may be dynamically adjusted across the frame, across timeslots of a frame, or even adjusted for individual quarter symbols of a time slot.

The method includes mapping each quarter symbol in a frame to an offset within a frame attenuation buffer; and includes a step of computing an initialization template, hereinafter referred to as "template" for the frame attenuation buffer. The frame attenuation buffer contains the attenuation values for all the quarter symbols (QSymbols) of a frame. Each entry of the template identifies a block of attenuation values within the frame attenuation buffer, which could be duplicated into a number of adjacent blocks. Since less computational effort is needed in duplicating blocks as opposed to computing them, this results in significant reduction in computational time in filling the frame attenuation buffer with the new attenuation values on a per frame basis (i.e., every 40 msec for IS-136).

The mapping of QSymbols and the template computation steps of the invention produce the same deterministic result. Therefore, enormous reductions in processing time are achieved by executing these two steps only once at the radio boot up time, instead of executing the steps repeatedly in real time on a per frame basis. To achieve dynamic power control, the transmit power, and thus the attenuation values, are computed on a per frame basis.

In order to fill the frame attenuation buffer quicker using fewer computations, blocks of attenuation values may be recursively copied into blocks of the frame attenuation buffer, as specified by the entries in the template. The recursive copying step results in a substantial reduction of computational time. If power is determined not to be constant across the frame, i.e., there is a ramp up/down in power level between adjacent timeslots in the frame, attenuation values for only certain quarter symbols in those timeslots are computed, and the corresponding blocks of the frame attenuation buffer are updated with the new values to account for the differing power levels.

Once all attenuation values have been computed and loaded into the frame attenuation buffer, the entire contents of the buffer are downloaded to a pair of digital to analog converters (DACs) in a radio board of the base transceiver station. This DAC attenuation data is used to attenuate the frame that is to be transmitted as part of an RF signal by an antenna to one or more mobiles in the network. Accordingly, since service providers need more capacity out of their existing networks, the TDMA Downlink Dynamic Power Control (TDDPC) method of the invention will improve the C/I on the downlink. This can result in networks migrating to a lower frequency reuse, thereby increasing the number of subscribers served by each network.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION

Before describing the method and apparatus of the invention in greater detail, a brief discussion of downlink dynamic power control is provided in order to provide a context for the invention.

Downlink Dynamic Power Control means that the transmit power from the base transceiver station to the mobile is not a constant parameter. An advantage of performing dynamic downlink power control is co-channel interference reduction and system RF quality improvement. In other words, a greater percentage of the users will receive the desired downlink signal due to the improved C/I (Carrier to Interference ratio), than in the case where no power control is used, for the same frequency reuse and cell coverage area, thus resulting in system capacity improvements.

The power control method, which is to be described in detail hereinafter, is equally applicable to all wireless networks using a TDMA based air interface, and particularly to systems using the North American TDMA Standard IS-136 (air interface). For the existing mobile stations assigned to a particular frequency, synchronization information is needed across all the time slots of a frame (40 msec spanning 6 half-rate timeslots). The required transmit powers for three users (i.e., mobile stations), where each user is using two half-rate timeslots, are first calculated using the downlink Bit Error Rate (BER) reported by the respective users. The base transceiver station then transmits at a power level that is scaled for the user's C/I requirement in the corresponding time slot pair.

For the rest of the two time slot pairs, the base transceiver station cannot transmit at powers lower than the highest power minus×dB (e.g., default value of 6 dB) so that the existing TDMA mobiles can safely obtain their synchronization information. The per timeslot power control option where the change in transmit power is limited to 6 dB has been tested with the current mobiles with success. For TDMA IS-136, power adjustments for the three users can be done independently, enabling the power control of the invention to further enhance interference reduction capability of a wireless system.

Figure 1:
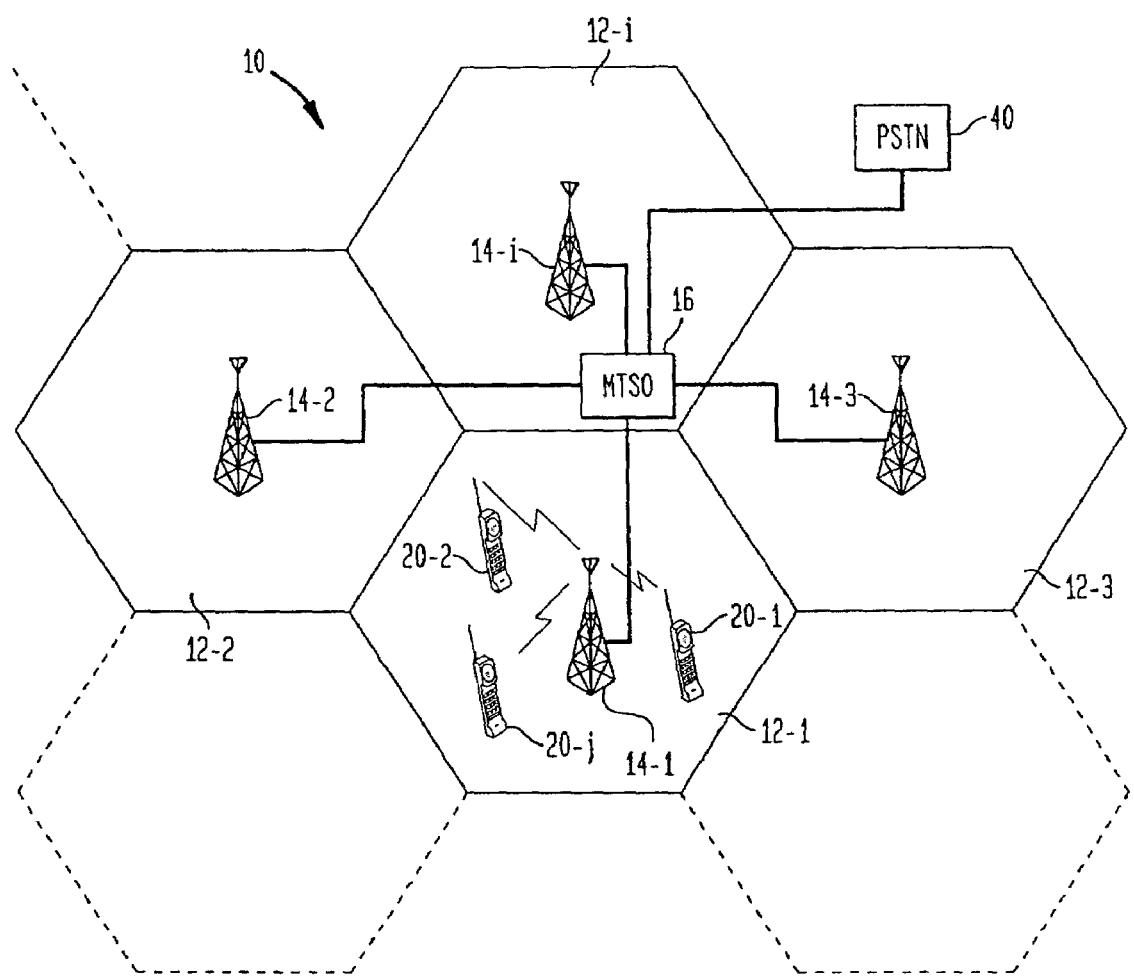
FIG. 1 illustrates a typical wireless communication network.
Figure 2:
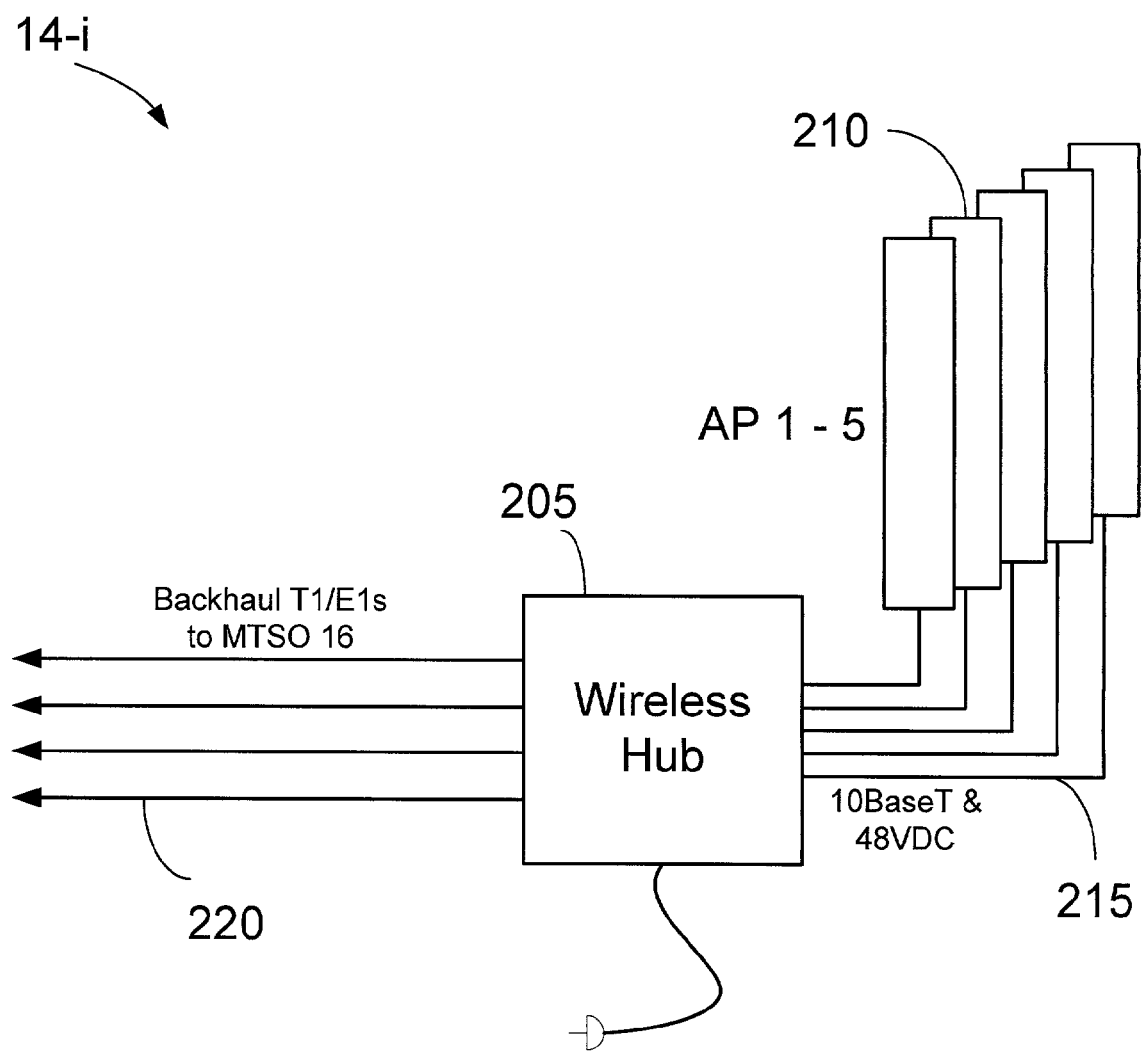
FIG. 2 illustrates a base transceiver station in accordance with the invention.

FIG. 2 illustrates a base transceiver station in accordance with the preferred embodiment. Each BTS 14-i is comprised of a wireless hub 205 and at least one or more access points (AP) 210. The wireless hub is preferably a signal router and power supply that supplies each AP with voltages and data (for example, 48V DC and standard 10Base-T LAN data) through cables 215, such as via 10Base-T cables. Further, all radio and signal processing functions (i.e., transmitting and receiving for BTS 14-i) is contained within AP 210. Further, the wireless hub 205 provides connections 220, such as T1/E1 lines, to mobile telephone switching office (MTSO) 16.

Figure 3:
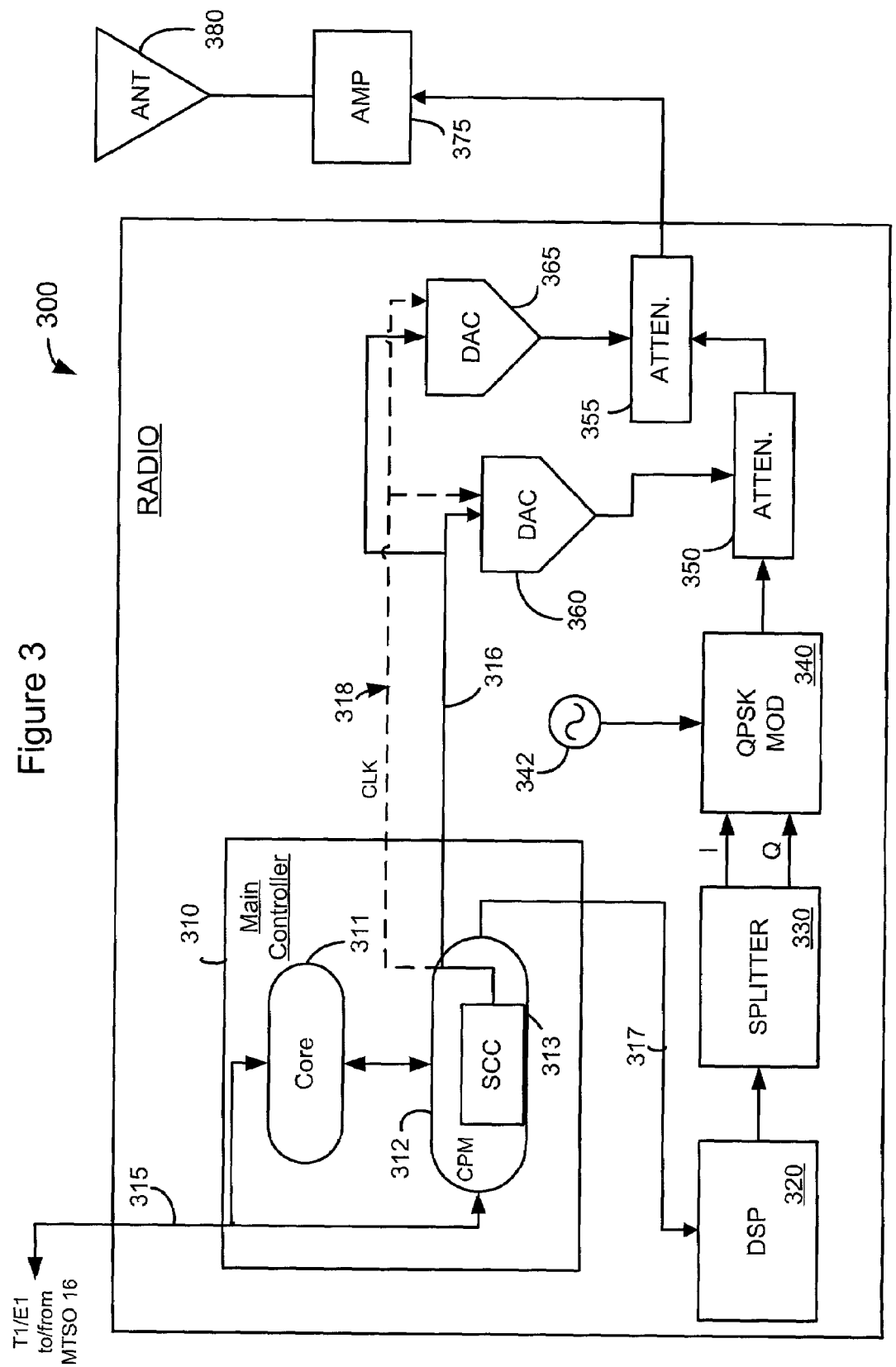
FIG. 3 illustrates a radio module in accordance with the invention.

FIG. 3 illustrates a radio board in accordance with the invention. Each AP 210 in BTS 14-i includes one or more radio boards 300. A BTS 14-I may have a dual radio module (DRM) in which two carriers (TX1 and Tx2) are transmitted to one or more mobile stations. FIG. 3 illustrates the architecture of a single exemplary radio board 300 of BTS 14-1 with transmit circuitry for one carrier. However, the present invention is not limited to a single carrier or radio, as the method may be used to process N carriers of N radios in a BTS.

Radio board 300 includes a main controller 310, which is the central processor on the radio board 300. Main controller 310 may be embodied as a general purpose processor or microprocessor, or a specialized processor such as a digital signal processor (DSP) or application-specific integrated circuit (ASIC). All application software, including the software that runs the power control method of the invention, runs on core 311. Core 311 may be embodied as a 32 bit microprocessor, for example, with built in memory management units, and instruction and data caches on main controller 310.

A communication processing module (CPM) 312 is responsible for all I/O to the main controller 310, and may be embodied as a 32-bit RISC (Reduced Instruction Set Computer) chip, for example. CPM 312 is in communication with MTSO 16 via a connection line 315, which may be a T1/E1 line, for example (connecting BTS 14-I to MTSO 16). CPM 312 receives voice frames from MTSO 16 that are to be transmitted to one or more mobile stations in the network. CPM 312 also generates an interrupt to the core 311 every 40 msec, the time corresponding to the frame duration of an IS-136 frame in the BTS 14-i. CPM 312 includes a serial communication controller (SCC) 313, which may also be a distinct device that is operatively connected to CPM 312. SCC 313 is used for serial communication with external devices on Radio Board 300, and may be embodied as a Universal Asynchronous Receiver Transceiver (UART), or embodied as any serial controller that is known or used in the art.

A digital signal processor (DSP) 320 receives user traffic, which could be embodied as voice frames or data frames, via line 317 and formats the frames as IS-136 (air interface) frames. The IS-136 frames are output to a splitter 330, which converts the IS-136 frames into baseband I/Q signal components. Splitter 330 may be embodied as a field programmable gate array (FPDA), a complex programmable logic device (CPLD) or any other discrete circuitry, for example.

These baseband I and Q components are input into a QPSK modulator 340. QPSK modulator 340 is responsible for modulating the baseband I/Q signal components of the IS-136 frame onto the carrier (channel) frequency of the Radio Board 300. The modulating frequency is provided by oscillator 342. The output of QPSK modulator 340 is a modulated RF signal, which is fed to a pair of attenuators 350 and 355. The attenuators 350 and 355 are responsible for adjusting the power of the modulated RF signal, which is then amplified at amplifier 375 prior to transmission as a downlink signal by an antenna 380, to be received by one or more mobile stations.

Radio Board 300 also includes a pair of digital to analog converters (DAC) 360 and 365, which are responsible for generating the analog attenuation bias for the attenuators 350, 355. The method of the invention provides the frame attenuation values that are downloaded by SCC 313 via line 316 to DAC's 360 and 365, and hence to attenuators 350, 355. Two DACs (and their corresponding attenuators 350, 355) are used in the radio board 300 to ensure a final granularity (for example, steps of 0.5 dB) for power control. In FIG. 3, radio board 300 is depicting the transmit path for only one carrier. The entire circuitry, except for the main controller 310, is repeated for every additional carrier (2 carriers, for example) on radio board 300.

In operation, a voice frame coming from MTSO 16 over the T1/E1 transmission line 315 is routed to call processing software running on the core 311 of the main controller 310. Call processing software in core 311 formats an appropriate air interface (e.g. IS-136) layer 2 message, and sends it from CPM 312 via line 317 to the DSP 320. A layer 2 message contains the user information to be transmitted on the air interface frame. Upon receiving the layer 2 message, DSP 320 formats the frame as an IS-136 air interface frame, and forwards the IS-136 formatted frame to the splitter 330.

Splitter 330 generates I and Q bit streams for input into the QPSK modulator 340. The modulated RF signal output of QPSK modulator 340 is then fed to the attenuators, 350 and 355, which control the transmit power of the IS-136 frame. SCC 313 sends clock signals over line 318 and attenuation data over line 316 to DACs 360, 365. The attenuators 350, 355 are controlled by the attenuation bias signals generated by the DACs 360 and 365. As noted above, DACs 360 and 365 in turn are controlled by attenuation data, commonly referred to herein as frame attenuation buffer values, DAC attenuation values or attenuation values. The attenuation values are computed using the power control method of the invention, described in detail below. The computations are performed by applications, algorithms and processes running on core 312. The attenuated RF signal from attenuator 355 is amplified at amplifier 375, and transmitted as a downlink RF signal by antenna 380. As will be explained in further detail below, the method computes frame attenuation values for the air interface frame. These values are used by the DACs 360, 365 to generate the attenuation bias signals that control attenuators 350 and 355, which in turn control the transmit power of the modulated RF signal.

Figure 4:
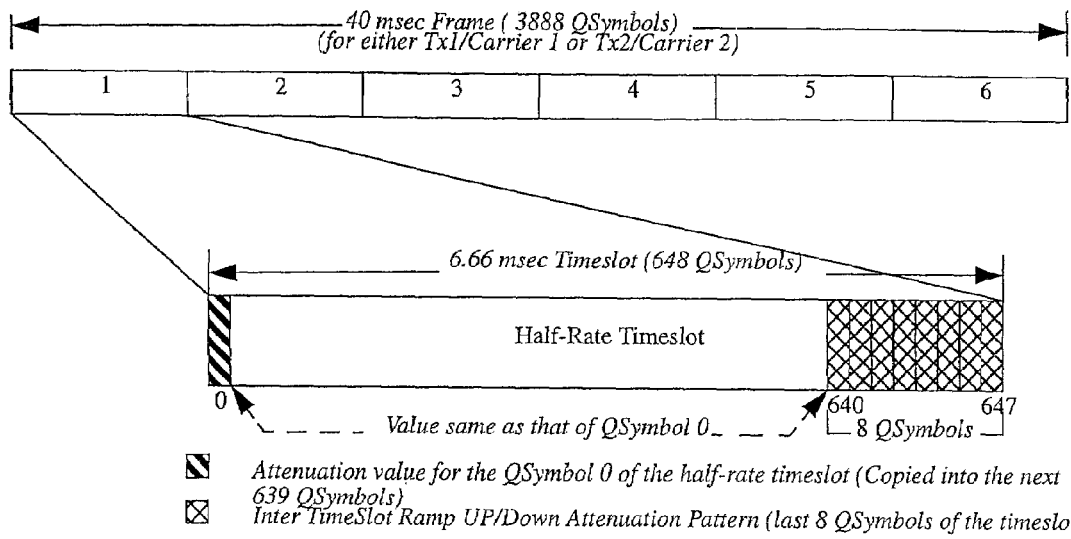
FIG. 4 illustrates the frame and timeslot structure for a TDMA IS-136 frame in accordance with the invention.

FIG. 4 illustrates the structure of an IS-136 air-interface frame in accordance with the invention. As shown in FIG. 4, each IS-136 frame is divided into six timeslots, known in the art as "half-rate timeslots". In networks using the TDMA IS-136 standard for frames, each of the three users use two half-rate timeslots (i.e., user 1 uses half-rate timeslots 1 and 4; user 2 uses half-rate timeslots 2 and 5, and user 3 uses half-rate timeslots 3 and 6). The present invention is not limited to three users, as the network is configurable to handle up to six users, one each per half-rate timeslot.

The frame has a duration of 40 milliseconds (msec), meaning that to dynamically control power on a per frame basis, the frame attenuation values should be computed within the 40 msec interval. Each timeslot is composed of 648 quarter symbols (QSymbol), thus each frame has a total of 3,888 QSymbols. As will be seen below, DAC attenuation values (e.g., for both of DACs 360 and 365) are to be provided for each QSymbol in the frame.

FIG. 4 also illustrates an exploded view of a half-rate timeslot (ts1). Instead of computing DAC attenuation values for each of the 3,888 QSymbols in the 40 msec frame, the method of the invention takes advantage of the fact that power, and hence the attenuation values remain at the same level for a number of consecutive QSymbols (639 QSymbols, or $\{1 \ldots 639\}$ to be precise) in each timeslot. As shown in the exploded view of FIG. 4, the DAC attenuation values computed for the first QSymbol of ts1 (QSymbol 0) remain the same for the next 639 QSymbols of ts1. This is due to the fact that power remains constant at the specified level during this interval of time within ts1.

To ensure smooth transition in power between adjacent half rate timeslots, DAC attenuation values are computed and populated in the last 8 QSymbols $\{640 \ldots 647\}$ of each half rate timeslot, so as to generate a smooth Gaussian ramp up/down waveform. This smooth transition is needed to eliminate spikes in power, which could flood the RF spectrum with noise. However, if the power remains the same across adjacent timeslots, then this Gaussian ramp up/down pattern is not required. Accordingly, at most only nine (9) QSymbols per half-rate timeslot require computation for their DAC attenuation values (QSymbol 0 and QSymbols 640–647 in FIG. 4), and the DAC attenuation value for QSymbol 0 is copied into its adjacent 639 QSymbols $\{1 \ldots 639\}$, since power is constant across that interval.

Figure 5:
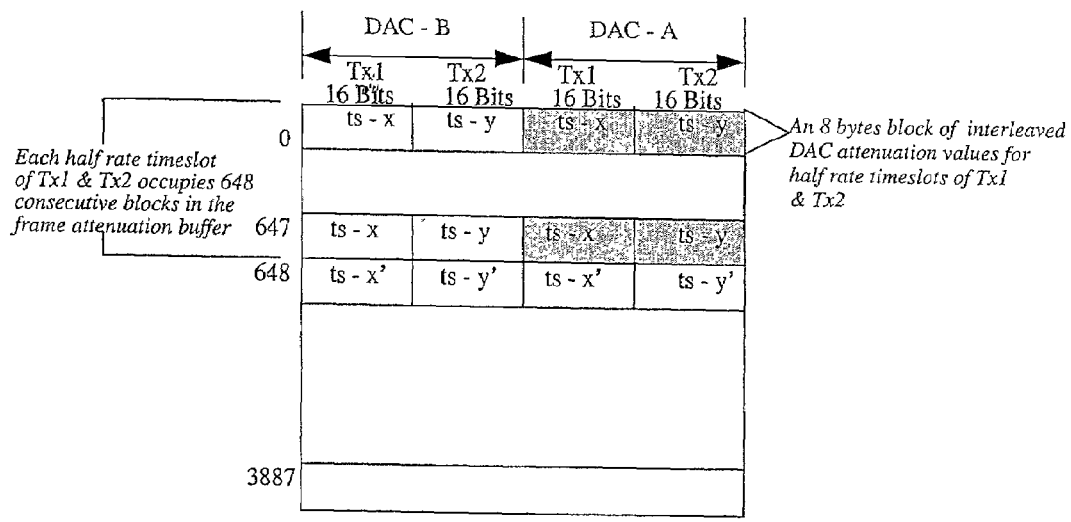
FIG. 5 illustrates a frame attenuation buffer structure in accordance with the invention.

FIG. 5 illustrates a frame attenuation buffer structure in accordance with the invention. The frame attenuation buffer is filled with DAC attenuation values in the core 311. Once a frame has been processed, the frame attenuation buffer is transferred to SCC 313 for downloading to DACs 360 and 365. This buffer consists of as many blocks as there are QSymbols in the air interface frame, e.g., 3,888 blocks for TDMA IS-136. Where a block contains the attenuation values for a QSymbol of each carrier on the radio board. The contents of the frame attenuation buffer control the transmit power at which the air interface frame is transmitted to one or more users (mobile stations).

One strength of the inventive power control it is that it uses a "divide and conquer" heuristic by identifying blocks of data which could be duplicated within the frame attenuation buffer, thus resulting in significant reduction in bit manipulation, indexing and assignment operations. A block is 8 bytes wide, and corresponds to a single entry in the frame attenuation buffer shown in FIG. 5. A block of the frame attenuation buffer contains attenuation values (shown as DAC-A, and DAC-B values for DACs 360 and 365) for a particular (not necessarily the same) QSymbol from Carrier 1 and Carrier 2.

As shown in FIG. 5, the DAC attenuation values of each QSymbol of each half-rate timeslot of the two carriers/Tx's are interleaved within 31,104 bytes (3888 Blocks*8 bytes per block) of the frame attenuation buffer. Each half-rate timeslot of carrier-1/Tx1 and carrier-2/Tx2 occupies 648 consecutive blocks in the frame attenuation buffer. The DAC values are shown as ts-x and ts-x' for half-rate timeslots of carrier-1/Tx1, where values of x and x' are in the range of [1 . . . 6]; and ts-y and ts-y' for half-rate timeslots of carrier-2/Tx2, where values of y and y' are in the range of [1 . . . 6].

DAC-A and DAC-B may represent buffer locations for entries designated for the two DACs 360 and 365. Each DAC attenuation value entry is 16 bits wide. The least significant three nibbles (i.e., 12 bits) specifies the attenuation value, and the most significant nibble specifies for which DAC (DAC 360 or DAC 365) the attenuation value is allocated. This is communicated to the hardware circuitry. Therefore, each DAC attenuation value entry in the frame attenuation buffer requires two bit manipulation operations: one operation is to set the attenuation value, and the second operation is to specify the DAC (DAC 360 or DAC 365). Since a block contains attenuation values for four entries, each block requires 8 bit manipulation operations (4 DAC attenuation entries*2 bit manipulation operations per DAC attenuation entry).

Figure 6:
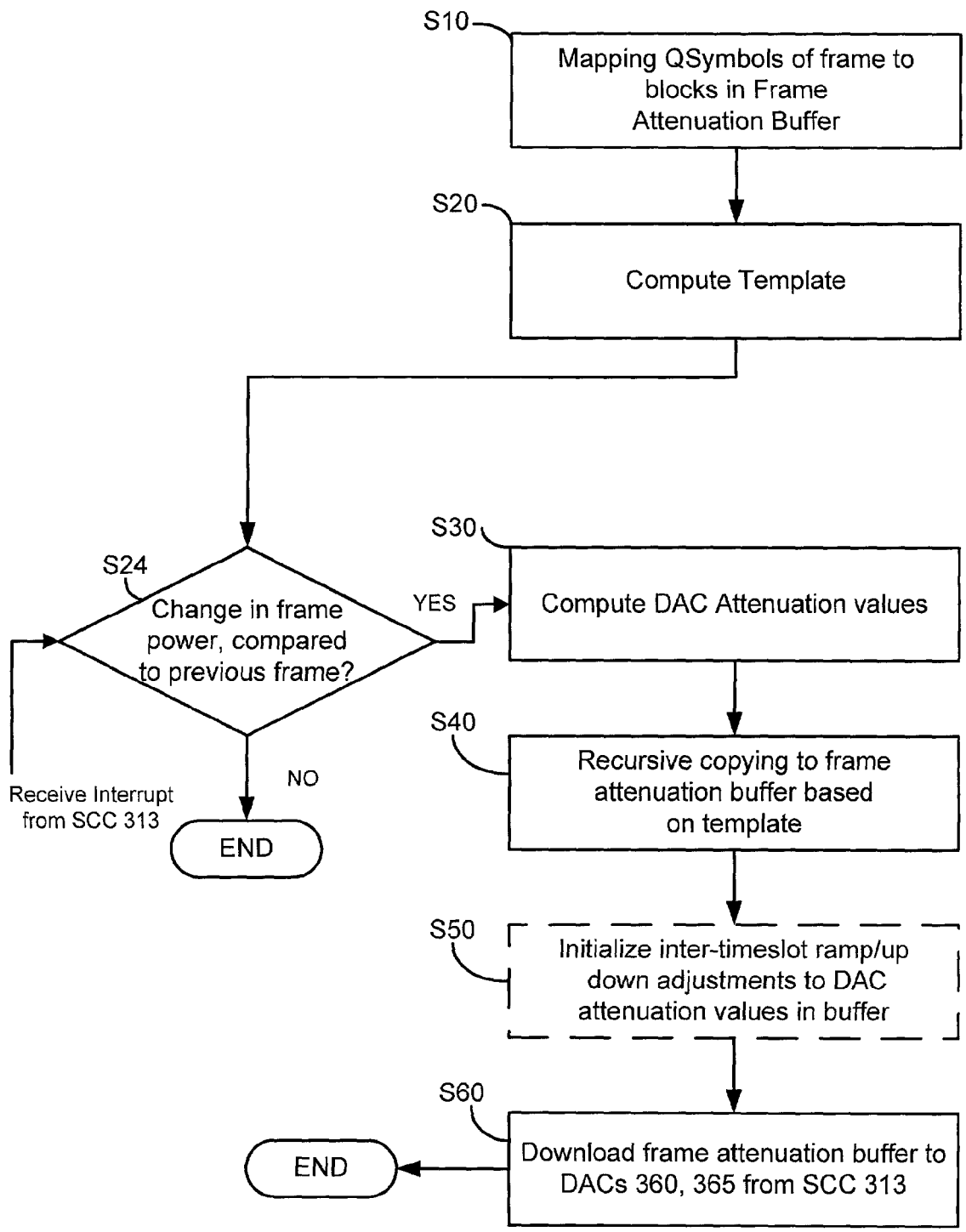
FIG. 6 is a flowchart illustrating the power control method in accordance with the invention.

FIG. 6 is a flowchart illustrating the power control method in accordance with the invention. Referring to FIG. 6, the first two steps are performed only once at the radio boot up time (i.e., initialization time) of the BTS. These steps include mapping the QSymbols of an IS-136 frame to the frame attenuation buffer (Step S10), and computing the template for the frame attenuation buffer of the IS-136 frame (Step S20).

In the mapping Step (S110), and assuming that there are two radio boards 300 transmitting two carriers (Tx1/Carrier-1, Tx2/Carrier-2), each radio board 300 is 2 msec skewed in time with respect to its adjacent radio board 300 within the AP 210 of BTS 14-i. The two carriers on the radio boards 300 are 10 msec skewed in time with respect to each other. This time skew is necessary to prevent overloading of the network elements handling the traffic frames, by ensuring that the packets from multiple carriers (IS-136 frame) do not arrive at the same instant in time at the network elements.

The beginning of a carrier's frame (QSymbol 0 of half-rate timeslot 1) within the 3,888 block frame attenuation buffer is dependent upon the identification of the radio (board ID) within the AP 210. Since the board ID is known, determination of the time skews, and hence the mapping, could be performed in a deterministic manner. Therefore, this mapping step is done only once at the radio boot up time.

Pseudocode developed for core 311 is used to compute the time skew (carrier1Skew, carrier2Skew) of carrier 1 and carrier 2 on the specified radio board, and their corresponding mappings (tx1Offset, and tx2Offset) to a particular block within the frame attenuation buffer. For example, in a radio, tx1 Offset is 147, and tx2Offset is 1119. This means that within the 3,888 block frame attenuation buffer, half-rate timeslot 1 of carrier 1 will start at block 147, and will occupy the next 648 consecutive blocks, i.e. up to block 795.

Half-rate timeslot 2 of carrier 1 will start from block 796 and will occupy the next 648 consecutive blocks, and so on. If the end of the 3,888 blocks is reached, then the calculations wrap around and start from the beginning. This happens when QSymbol 0 of half-rate timeslot 1 is not mapped to Block 0 of the frame attenuation buffer.

QSymbol 647 (last QSymbol) of half-rate timeslot 6 will be adjacent to QSymbol 0 (first QSymbol) of half-rate timeslot 1, and the attenuation values of all the QSymbols before the QSymbol 0 of half-rate timeslot 1 of carrier 1, comes from the previous frame. The same logic applies to the half-rate timeslots of carrier 2. This mapping step is explained in further detail in reference to FIG. 7 below.

At the completion of the mapping Step S10, each QSymbol of the two carriers (carrier-1/Tx1, carrier-2/Tx2) are mapped to a particular block of the frame attenuation buffer. Some of the consecutive blocks within the frame attenuation buffer contain the same information (due to a partial overlap of the half-rate timeslots from the two carriers. Assuming that the power remains constant in all the 648 QSymbols of a half-rate timeslot, and using the result of the mapping step, a template for the frame attenuation buffer is generated and stored in core 311 (Step S20).

The template contains entries that indicate a block of attenuation values within the frame attenuation buffer, and the number of adjacent blocks which are identical to it. This leads to a significant reduction in computation time, because this step identifies blocks of data which could be duplicated rather than computed.

Once the initialization steps are completed, the core 311 begins receiving interrupts from SCC 313. The interrupts are generated every 40 msec, which represents the frame duration (and time available to compute DAC attenuation values) for an IS-136 frame. Core 311 determines whether or not there is a change in frame power as compared to the previous frame (Step S24). If no change (NO in Step S24), the process ends and the frame is transmitted.

Prompted by each interrupt, if there is a change in frame power between frames (YES in Step S24), dynamic power control is required. Software in core 311 computes DAC attenuations values (Step S30) for the QSymbols in the IS-136 frame. Although each QSymbol in a frame has DAC attenuation values associated with it, DAC attenuation values are not computed for each QSymbol (i.e., there are not 15,552 DAC attenuation values (3,888 QSymbols per frame*2 DAC attenuation values per QSymbol*2 Carriers per radio board) computed in core 311). This is in part due to processing time saving features of the invention. The computation of DAC attenuation values are based on the frequency of the particular carrier (carrier 1/carrier 2), the desired cell transmit power (from reported mobile station bit error rate (BER)); and the temperature of the cabinet that houses the BTS 14-i and/or AP 210.

For inter-frame TDDPC, where the power remains constant across all the timeslots of a frame, the attenuation values are computed for only the first QSymbol of timeslot 1 for each carrier. This results in a total of 4 DAC attenuation values computations (1 QSymbol per carrier*2 DAC attenuation values per QSymbol*2 Carriers) in step S30.

For intra frame TDDPC, where each half rate timeslot in the frame may be at a different power level, the attenuation values are computed for only the first QSymbol of each half rate timeslot for each carrier. This results in a total of 24 DAC attenuation value computations (1 QSymbol per half rate timeslot*6 half rate timeslots*2 DAC attenuation values per QSymbol*2 Carriers) in step S30.

As noted above, the method includes features designed to limit the amount of computations required for a particular frame. One of these features is the duplication of data using a recursive data copying technique for the entries in the template. Each template entry corresponds to a block within the frame attenuation buffer, and specifies how many adjacent blocks contain identical attenuation values. Therefore, each template entry requires only 8 bit manipulation operations. For a 2 carrier radio board, the number of entries in the template always comes out to be 13, irrespective of the radio board ID. Thus, instead of performing 31,104 bit manipulation operations (3,888 blocks per frame*8 bit manipulation operations per block), the method only requires 104 such operations (13 entries in the template*8 bit manipulation operations per entry).

The number of duplicate blocks identified by each entry in the template are copied using a recursive memory copying algorithm (Step S40). This concept of recursive copying is described in detail below regarding FIG. 9, but in general terms, DAC attenuation value computations for one block are copied into an adjacent block, the two blocks are copied in an adjacent two blocks, etc. An overriding assumption for recursive copying is that the power across all blocks, identified by each entry in the template, is constant.

However, power may not be constant across an entire IS-136 frame. Power may vary between adjacent timeslots in a frame, even between QSymbols in a half-rate timeslot. Accordingly, where power changes, an initialization of inter-timeslot Ramp Up/Down attenuation value computation (Step S50) is required. This step is only needed for adjacent half-rate timeslots having different power levels. Since each half rate timeslot needs this waveform in only its last 8 QSymbols (refer to the exploded view showing the last 8 QSymbols of a half-rate timeslot), an additional 384 bit manipulation operations are required (8 QSymbols per half rate timeslot*6 Half-rate timeslots*2 Carriers*2 DAC entries per QSymbol*2 bit manipulation operations per DAC entry). This is a maximum number of updated DAC attenuation value computations, and is based on an assumption that all six (6) half-rate timeslots of both carriers have different power levels.

This may not always be true, as a carrier equipped with a control channel always transmits at MAX POWER in all six half-rate timeslots of that carrier. Similarly, a carrier will transmit MIN POWER in timeslots containing no calls. So depending upon the radio configuration, and the call load of the carriers, this step requires between 0-384 bit manipulation operations (192 in case of a radio equipped with a control channel). For the inter-frame TDDPC case (where transmit power varies between frames but is constant across a frame), only an additional 64 bit manipulation operations are required (8 QSymbols per half rate timeslot*1 half rate timeslot*2 DAC entries per QSymbol*2 bit manipulation operation per DAC entry*2 carriers). The 8 QSymbols processed represent the final 8 QSymbols of the last half-rate timeslot (ts 6) of the current frame.

Once the frame attenuation buffer is completely filled with the attenuation values for the entire IS-136 frame, it is downloaded (Step S60) to DACs 360 and 365 from core 311 via SCC 313 and line 316. These values are used by the DACs to generate the attenuation bias signals which control attenuators 350 and 355, which in turn control the transmit power of the modulated RF signal.

Figure 7:
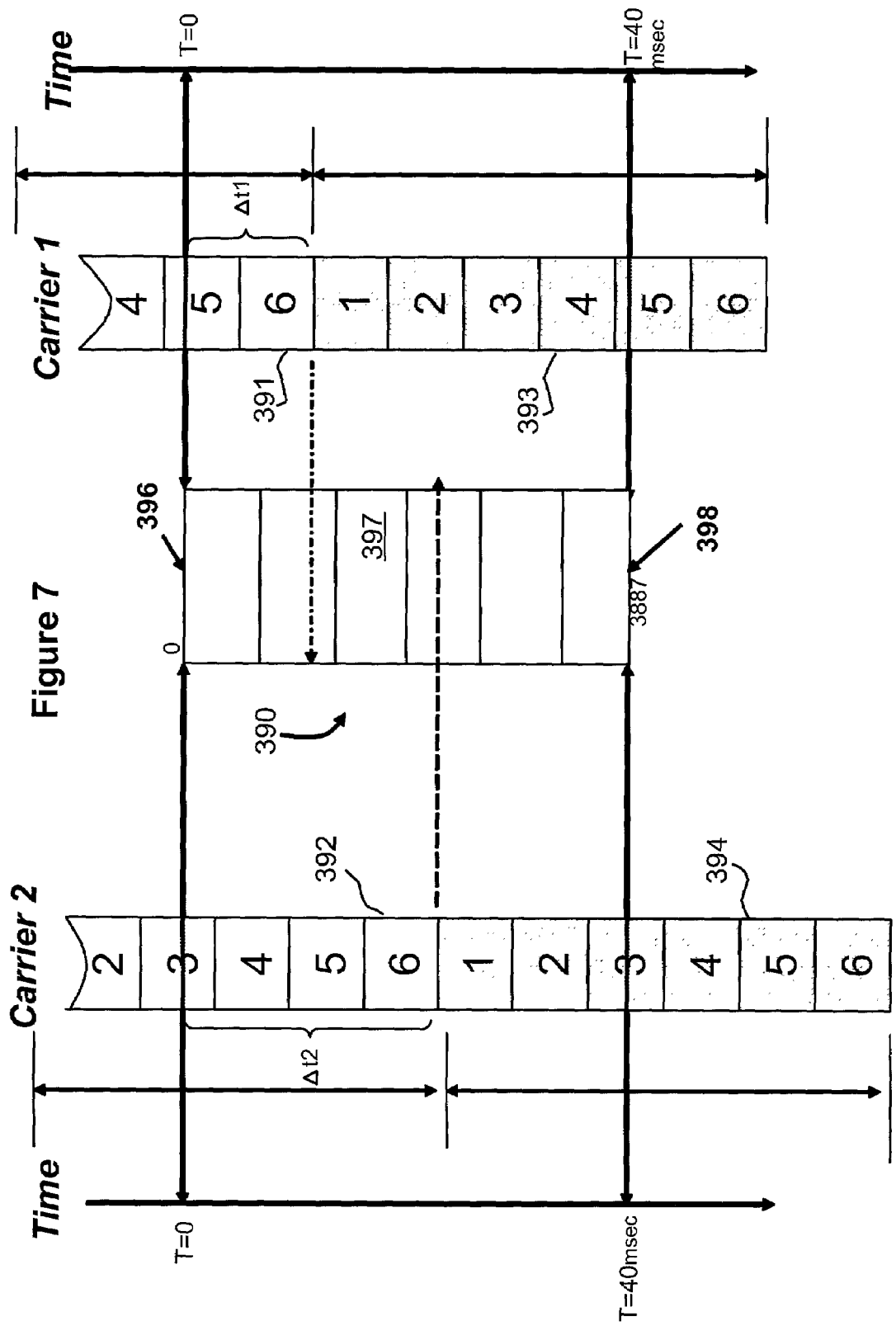
FIG. 7 illustrates a relationship between the frame attenuation buffer and the TDMA IS-136 frame to describe the mapping step of FIG. 6.

FIG. 7 illustrates a relationship between the frame attenuation buffer and the TDMA IS-136 frame to describe the mapping step of FIG. 6 in further detail. In FIG. 7, there are frames of two carriers; a current (393) and previous (391) frame of Carrier 1, and a current (394) and previous (392) frame of Carrier 2. The frame attenuation buffer 390 is broken up into blocks, block 0 (element 396) to block 3,887 (element 398) representing a total of 3,888 blocks. As shown in FIG. 7, the buffer 390 is divided into six groups of blocks 397, each group representing DAC attenuation values for 648 QSymbols for all carriers on the radio board 300.

As shown in FIG. 7, and starting at block 0 (element 396, T=0) of frame attenuation buffer 390, the first block contains attenuation values of QSymbols in both ts5 of preceding frame 391 of carrier 1 and ts3 of preceding frame 392 of carrier 2. The mapping of a frame to an offset is evident since the corresponding preceding frames (391, 392) in the two carriers are offset from block 0 (396) and hence the groups of blocks 397 of buffer 390 by an offset (see Δt1 and Δt2).

For example, ts6 (of the preceding frame 391) in Carrier 1 is partially offset mapped to both the first and second block groups 397 of the buffer 390, and ts 6 of preceding frame 392 of carrier 2 is partially offset mapped to the third and fourth group blocks 397 of the frame attenuation buffer 390. The DAC frame attenuation values from the timeslots of these preceding frames are used when processing current frames 393 and 394, even though these current frames 393 and 394 start after T=0. Since frames are continually being processed, DAC attenuation values of an entire frame (parts of the preceding and current frames 391, 392 and 393, 394), in each carrier to be mapped within the 40 msec frame duration.

The following Table 1 illustrates an exemplary frame attenuation buffer fill pattern for the template:

TABLE 1

| Tx1 timeslot | Tx2 Timeslot | # of 8-byte duplicate blocks |
|---|---|---|
| 6 | 5 | 146 |
| 1 | 5 | 323 |
| 1 | 6 | 323 |
| 2 | 6 | 323 |
| 2 | 1 | 323 |
| 3 | 1 | 323 |
| 3 | 2 | 323 |
| 4 | 2 | 323 |
| 4 | 3 | 323 |
| 5 | 3 | 323 |
| 5 | 4 | 323 |
| 6 | 4 | 323 |
| 6 | 5 | 176 |

At the completion of the mapping step, each QSymbol of the two carriers (carrier-1/Tx1, carrier-2/Tx2) are mapped to a particular block within the frame attenuation buffer. Assuming that the power, and therefore the attenuation values, remains the same for all 648 QSymbols within a half-rate timeslot of a carrier, some of the consecutive blocks in the frame attenuation buffer contain the same information (due to the partial overlap of the half-rate timeslots from the two carriers, as shown in FIG. 7.

Referring to table 1, each entry of the template consists of three fields: half-rate timeslot number from Carrier 1 (Tx1 Timeslot); half-rate timeslot number from carrier 2 (Tx2 timeslot) and the number of consecutive duplicate blocks in the frame attenuation buffer following this block. Pseudocode developed for core 311 is used to generate the template data of Table 1. As shown in Table 1, the template for a radio board with two carriers consists of 13 entries. This implies that attenuation values are computed for only 13 blocks as opposed to the 3,888 blocks in the frame attenuation buffer.

Referring again to Table 1, the first entry of the template depicts that the 8-bytes block corresponding to Block 0 of the DAC frame attenuation buffer of FIG. 5, and uses attenuation values for half-rate timeslot 6 of carrier 1, and half-rate timeslot 5 of carrier 2. This 8 byte block is copied into the next 146 blocks (1168 bytes) within the frame attenuation buffer (i.e. Block 0 is copied into Blocks {1 . . . 146}).

The second entry of the template in Table 1 shows that block 147 of the frame attenuation buffer, containing DAC attenuation values for half-rate timeslot 1 of carrier 1 and half-rate timeslot 5 of carrier 2, will be copied into the next 323 blocks (2,584 bytes) within the frame attenuation buffer (i.e., block 147 is copied into blocks {148 . . . 471}), etc.

The computations to generate the template are dependent upon the identification (board ID) of the respective radio board 300. Accordingly, the template is computed only once at the initialization time, providing an enormous saving of processing time during real time (every 40 msec) computations and updates of the DAC frame attenuation values.

Figure 8:
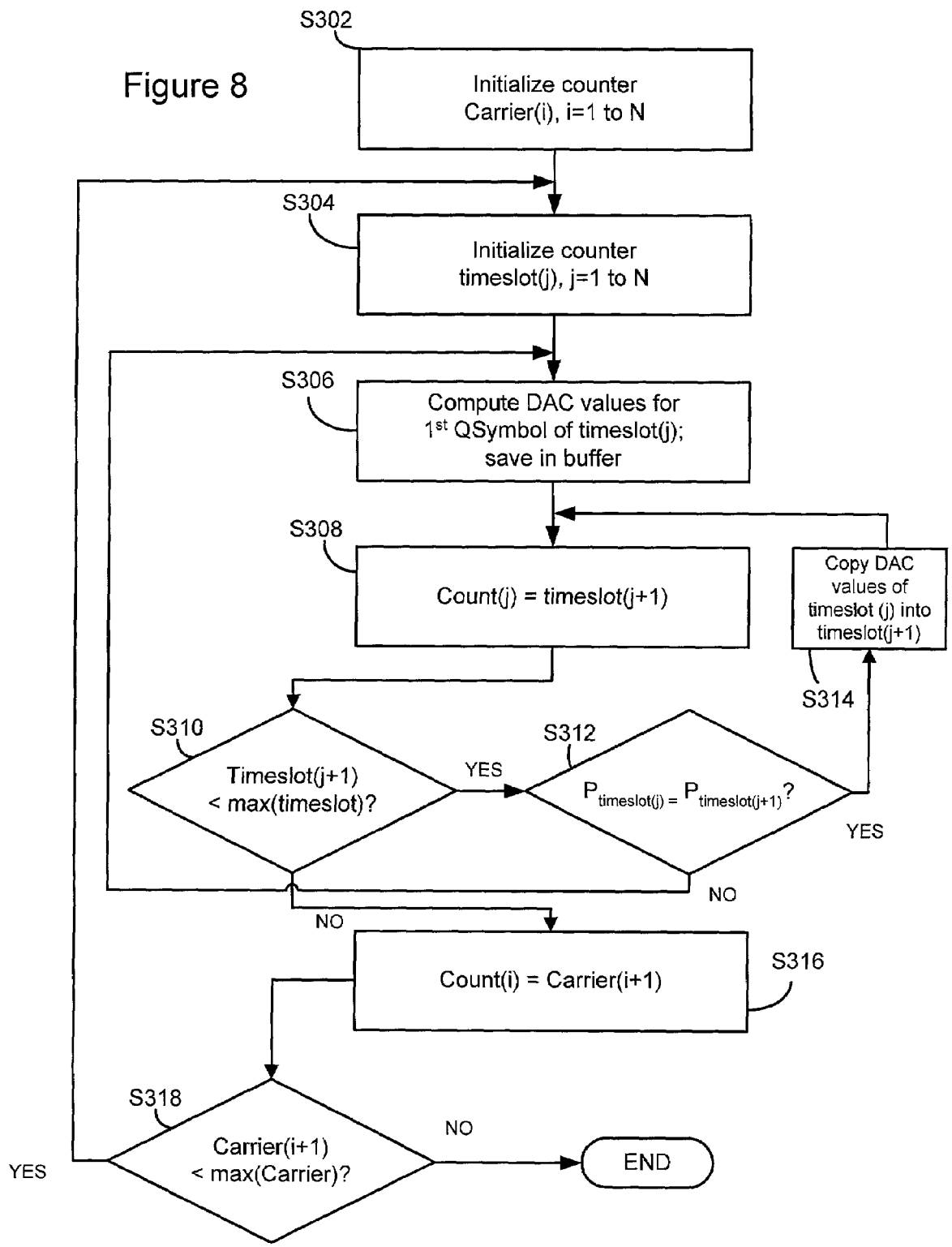
FIG. 8 is a flowchart describing the computation of DAC attenuation values step of FIG. 6.

FIG. 8 is a flowchart describing the computation of DAC attenuation values in FIG. 6. Initially, a counter for counting the carriers is initialized to begin with the first carrier (Step S302) of the radio 300 (carrier (i), where i=1 to N). Additionally, a counter for the half-rate timeslots of that carrier is initialized (Step S304) (timeslot (j), where j=1 to N). The DAC attenuation values for the first QSymbol (QSymbol 0 for ts 1, for example) is calculated (Step S306). If the current timeslot has not exceeded the maximum allotted for that carrier (N=6 timeslots for IS-136; N=8 for GSM carriers), (i.e., YES in Step S310), then the power of timeslot (j) is compared against an adjacent timeslot to determine if it is the same (Step S312). If YES, then the DAC attenuation values of timeslot (j) is copied into the next timeslot (j+1), and step S308 is repeated for the remaining timeslots in carrier (i). If the output of Step S312 is NO, then Steps S306 and S308 are performed to account for the change in power.

If the output of Step S310 is NO, the last timeslot of the frame has been processed, and the next carrier (Carrier (i+1)) is evaluated as above (Step S316), so when all the carriers of the Radio Board 300 have had the DAC attenuation values computed (NO in Step S318), the processing ends.

As will be seen in further detail below with regard to FIG. 10, for the Inter-frame TDDPC mode of Step S50, where power between frames varies but power across a single frame is constant, an additional 32 attenuation value computations are performed (8 QSymbols per half rate timeslots*1 half rate timeslot*2 DAC computations per QSymbol*2 Carrier). For the Intra-frame TDDPC mode, where power between timeslots in a frame could vary, an additional 192 DAC computations are performed (8 QSymbols per half rate timeslot*6 half rate timeslots*2 DAC entries per QSymbol*2 Carriers).

Figure 9:
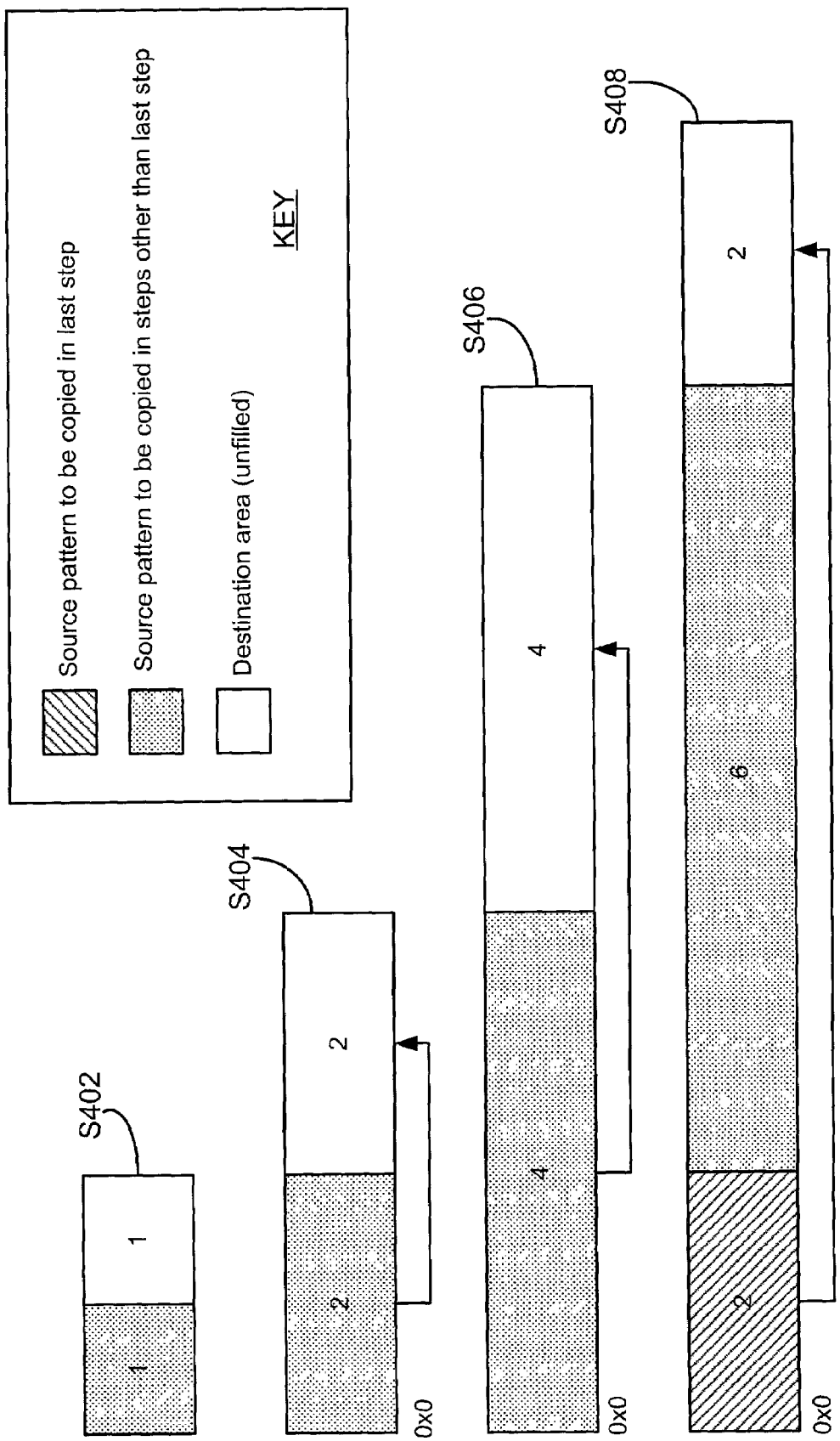
FIG. 9 describes the data duplication step of FIG. 6.

FIG. 9 describes the data duplication step (Step S40) of FIG. 6. As noted above, the number of duplicate blocks identified by each entry of the template, are copied using a recursive memory copying algorithm. This algorithm has a logarithmic complexity O (ln N), and preferably utilizes a highly efficient memory copying library routine provided by a real time operating system used in a product employing the method, such as core 311 of radio board 300. The library memory copying routine may copy data up to a long word (i.e., 64 bytes) at a time, if the data is aligned on a word boundary, as in the exemplary embodiment.

The concept of recursive copying is shown in FIG. 9, where in the first step (S402) one block (representing 8 bytes) is copied into its adjacent block. In the second step (S404) the 2 blocks from step S402 are copied into the adjacent 2 blocks, and so on (Steps S406, S408). Since in each successive step of copying twice the number of blocks are copied, as compared to the previous step, this results in a logarithmic complexity for the recursive copying algorithm. Instead of using a linear approach to duplicate an 8-byte block into a destination area encompassing 9 adjacent blocks (72 bytes), where 9 copy operations would have been required, this algorithm achieves the same result using just 4 copy operations. This results in a marked reduction in computation time.

Each entry listed in Table 1 above requires a maximum of 9 copying operations for the duplication of data. Therefore, based on the template, only 117 indexing and copy operations (9 copy operations per entry*13 entries in the template) are required to completely populate the frame attenuation buffer.

Figure 10:
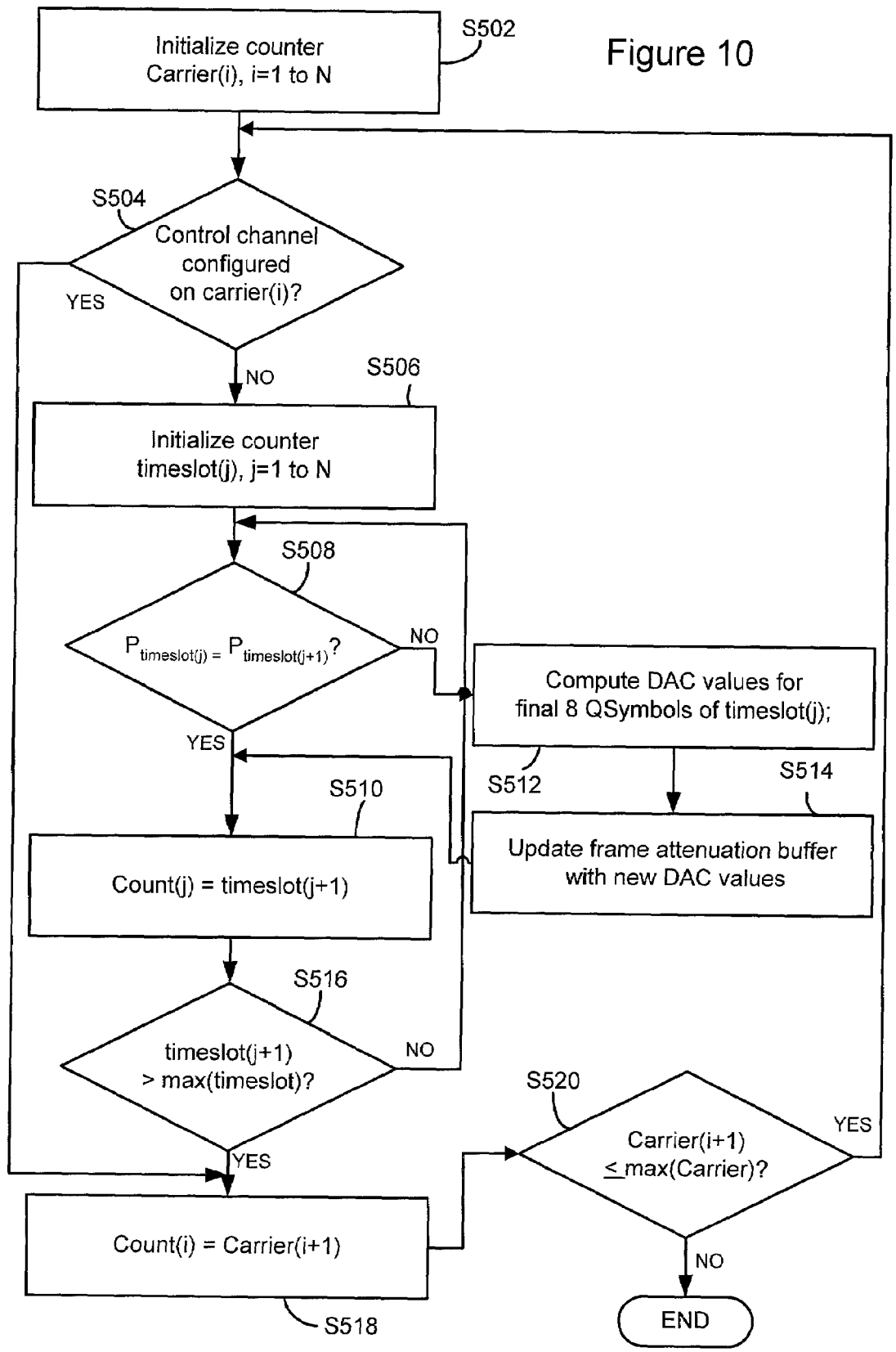
FIG. 10 is a flowchart illustrating the initialization of inter-timeslot ramp up/down pattern step of FIG. 6.

FIG. 10 is a flowchart illustrating the initialization of inter-timeslot ramp up/down pattern step of FIG. 6. Initially, a counter for counting the carriers is initialized to begin with the first carrier (Step S502) of the Radio Board 300 (carrier (i), where i=1 to N). Next, it is determined whether a control channel is configured (Step S504) on the carrier (i). If YES, the frames of that carrier are transmitted at MAX power in all the half rate timeslots on that carrier. Consequently, there is no need to compute any additional DAC attenuation values for the QSymbols of a carrier. If NO, a counter for the half-rate timeslots of that carrier is initialized (Step S506) (timeslot (j), where j=1 to N).

The power of timeslot (j) is compared against an adjacent timeslot to determine if it is the same (Step S508). If YES, the next timeslot (j+1) is evaluated (Step S510). If NO, DAC attenuation values for the last 8 QSymbols of timeslot (j) are calculated (Step S512) to account for any ramp up/down in power between timeslots. This is done to ensure smooth transition in power between adjacent half rate timeslots. DAC attenuation values are computed and populated in the last 8 QSymbols {640 . . . 647} of the half rate timeslot to generate a smooth Gaussian ramp up/down waveform. This smooth transition is needed to eliminate spikes in power, which could flood the RF spectrum with noise. Accordingly, only nine (9) QSymbols per half-rate timeslot require computations to their DAC attenuation values. See, for example, QSymbol 0 and QSymbols 640–647 in FIG. 4 where the DAC attenuation value for QSymbol 0 is copied into the adjacent 639 QSymbols {1 . . . 639}, since power is constant across that interval. Once the attenuation values for the inter-timeslot dynamic power control have been computed, the DAC frame attenuation buffer is updated (Step S514) with the new values.

These steps are repeated (Step S516) for the remaining timeslots in carrier (i). Carrier (i+1) is evaluated as above (Step S518), so when all the carriers of the Radio Board 300 have had their attenuation values for inter-timeslot dynamic power control computed (NO in Step S520), the initialization of inter-timeslot Ramp Up/Down attenuation value computation (Step S50) is complete. Thus, for intra-frame TDDPC, an additional 192 indexing and copying operations are performed in step S50 (8 QSymbols per half rate timeslots*6 half rate timeslots*2 DAC entries per QSymbol*2 Carriers); and 384 bit manipulation operations, using the above equation, except that there are 2 bit manipulation operations per DAC entry.

For inter-frame TDDPC, where power remains constant within a frame N (i.e. all 6 half-rate timeslots), but varies across frames (i.e. transmit power between ts 6 of frame N, and ts 1 of frame N+1 differ), step S50 performs an additional 32 indexing and bit manipulation operations (8 QSymbols per half rate timeslot*1 half rate timeslot*2 DAC entries per QSymbol*2 Carriers). Additionally, 64 additional bit manipulation operations are performed, using the above equation multiplied by 2 bit manipulation operations per DAC entry.

Exemplary Calculations

For Intra-frame dynamic power control, where each half-rate timeslot of the two carriers on the radio board is at a different power level (a worst case scenario), the method of invention performs 216 DAC attenuation computations: 24 computations in step S30 of FIG. 6, and 192 computations in step S50). There are a total of 488 bit manipulation operations (104 in step S40, and 384 in step S50), and 309 indexing and copy operations (117 in step S40, and 192 in Step S50).

As a comparison, in order to perform intra-frame TDDPC in systems which do not utilize the method of this invention (i.e., a non-TDDPC system), 15,552 DAC computations are required:

$$\begin{aligned}\text{\#DAC Computations} &= \\ (648 \text{ Q Symbols per half rate timeslots} &* 6 \text{ half rate timeslots} * \\ 2 \text{ DAC computations per Q Symbol} &* 2 \text{ carriers}) = 15{,}552\end{aligned} \quad (1)$$

For the non-TDDPC system, 31,104 bit manipulation operations are required:

$$\begin{aligned}\text{\#Bit manipulations} &= \\ (648 \text{ Q Symbols per half-rate timeslot} &* 6 \text{ half-rate timslots} * 2 \\ \text{DAC entries per Q Symbol} &* 2 \text{ bit manupulation} \\ \text{operations per DAC entry} &* 2 \text{ carriers}) = 31{,}104\end{aligned} \quad (2)$$

For the non-TDDPC system, 15,552 indexing and copying operations are required:

$$\begin{aligned}\text{\#Indexing/copying operations} &= \\ (648 \text{ Q Symbols per half rate timeslots} &* 6 \\ \text{half rate timeslots} &* 2 \text{ Index/copying operations} \\ \text{per Q Symbol} &* 2 \text{ carriers}) = 15{,}552.\end{aligned} \quad (3)$$

Thus to perform intra-frame TDDPC, the method of invention results in 98.6% reduction in DAC computations (Equation 1 yields 216 using the method of the invention), 98.43% reduction in bit manipulation operations (Equation 2 yields 488 operations using the method of the invention), and a 98.01% reduction in indexing and copying operations (Equation 3 yields 309 operations using the method of the invention). This significant reduction in computational effort results in performing the intra frame dynamic power control in about 38 msec (as opposed to 600 msec in the non-TDDPC system, a performance improvement by a factor of approximately 14).

For the inter-frame dynamic power control, where power remains constant across all the half rate timeslots of a frame for each carrier on the radio board 300, the method achieves (using the same equations (1) through (3): 36 DAC attenuation computations (4 in step S30, and 32 in step S50), 168 bit manipulation operations (104 in step S40, and 64 in step S50), and 149 indexing and copy operations (117 in step S40, and 32 in Step S50).

In non-TDDPC systems which do not utilize the method of this invention require: Equations (1) to (3) yield 15,552 DAC computations, 31,104 bit manipulation operations and 15,552 indexing and copying operations for inter-frame power control. Thus, the method of invention results in a 99.76% reduction in DAC computations, 99.45% reduction in bit manipulation operations, and a 99.04% reduction in indexing and copying operations. This significant reduction in computational effort results in performing inter-frame dynamic power control in about 11–14 msec (as opposed to 600 msec needed by a non-TDDPC system), a performance improvement by a factor of approximately 41.

The invention being thus described, it will be obvious that the same may be varied in many ways. The above-described method and apparatus has been described as comprised of several components, flowcharts or blocks, it should be understood that the method can be implemented in application specific integrated circuits, software-driven processor circuitry, or other arrangements of discrete components. Such variations are not to be regarded as a departure from the spirit and scope of the invention, and all such modifications as would be obvious to one skilled in the art are intended within the scope of the following claims.

We claim:

1. A method of attenuating downlink transmit power to transmit a frame of data in a wireless network, each frame composed of timeslots, each timeslot composed of quarter symbols, comprising:
    (a) mapping each quarter symbol of a frame to an offset within a frame attenuation buffer;
    (b) computing a template for the frame;
    (c) providing attenuation values for each quarter symbol, the provided attenuation values being grouped in blocks;
    (d) recursively copying blocks of attenuation values into the frame attenuation buffer based on the template; and
    (e) attenuating transmit power of the frame based on contents of the frame attenuation buffer.

2. The method of claim 1, wherein steps (a) and (b) are performed only once at an initialization time.

3. The method of claim 1, wherein steps (c) through (e) are performed if there is a change in transmit power of the frame as compared to the transmit power of a preceding frame.

4. The method of claim 1, wherein if there is no change in transmit power of the frame from transmit power of a preceding frame, the frame is transmitted without computations.

5. The method of claim 1, wherein if there is a change in transmit power between adjacent timeslots in the frame, step (c) is performed for the first quarter symbols of each timeslot in the frame and copied into remaining quarter symbols of each respective timeslot.

6. The method of claim 1, wherein if adjacent timeslots are at the same power level, the first quarter symbol is copied from a previous timeslot to an adjacent current timeslot.

7. The method of claim 1, wherein if there is a change in transmit power between adjacent timeslots in the frame, step (c) is performed for each of the final eight quarter symbols in each timeslot in the frame that adjoins a timeslot having a different transmit power.

8. The method of claim 1, further comprising the steps of:
(f) determining whether transmit power level differs between adjacent timeslots, and
(g) adjusting the computed attenuation values up or down in each of the timeslots based on the difference in power level between adjacent timeslots, steps (f) and (g) being performed prior to step (e), if step (f) determines that transmit power level differs between adjacent timeslots.

9. The method of claim 8, wherein steps (f) and (g) are performed for the last eight quarter symbols in each timeslot, if there is a change in power between adjacent timeslots.

10. The method of claim 1, wherein computations are performed in a span of about 40 msec, the duration of the frame.

11. The method of claim 10, wherein if power is constant across the frame, computations are performed in a span of about 11–14 msec.

12. The method of claim 10, wherein if power varies between timeslots, computations are performed in a span of about 38 msec.

13. The method of claim 1, wherein step (c) further includes computing attenuation values for less than all the quarter symbols in the frame.

14. The method of claim 13, wherein attenuation values are computed for a first quarter symbol and a final eight quarter symbols in each timeslot, when power is changing between adjacent timeslots in or across a frame.

15. The method of claim 13, wherein attenuation values for the first quarter symbol are computed and copied into all remaining quarter symbols in the frame, when power is constant across all timeslots in the frame.

16. The method of claim 1, wherein step (d) further comprises the steps of:
(d1) copying a first block of attenuation values stored in the frame attenuation buffer into an adjacent block, thereby forming two identical blocks;
(d2) copying the two identical blocks into two adjacent blocks in the frame attenuation buffer.

17. The method of claim 16, wherein step (d2) is logarithmically repeated to copy twice the number of blocks of the previous copying step into an equal number of blocks in the successive copying step to fill the attenuation buffer.

18. An apparatus for attenuating downlink transmit power to transmit a frame of data in a wireless network, each frame composed of timeslots, each timeslot composed of quarter symbols, comprising:
a buffer for storing attenuation values to be used in attenuating transmit power of the frame;
a processor for mapping each quarter symbol to an offset within the buffer, for computing a template to be used for filling the buffer, for providing attenuation values for each quarter symbol in the buffer, the provided attenuation values being grouped in blocks, and for recursively copying blocks of attenuation values into the buffer based on the template; and
a controller for outputting contents of the buffer to attenuate transmit power of the frame.

19. The apparatus of claim 18, wherein the processor maps the quarter symbols and computes the template only once at an initialization time.

20. The processor of claim 18, wherein if there is a change in transmit power between adjacent timeslots in the frame, the processor computes attenuation values for the first quarter symbols of each timeslot in the frame, the attenuation values being copied in the buffer for the remaining quarter symbols of each respective timeslot.

21. The processor of claim 18, wherein if adjacent timeslots are at the same power level, a first quarter symbol is copied from a previous timeslot to an adjacent current timeslot.

22. The processor of claim 18, wherein if there is a change in transmit power between adjacent timeslots in the frame, the processor computes attenuation values for each of the final eight quarter symbols in each timeslot that adjoins a timeslot having a different transmit power.

23. The apparatus of claim 18, wherein process time is about 40 msec, the duration of the frame.

24. The apparatus of claim 18, wherein the processor computes attenuation values for less than all the quarter symbols in the frame.

25. The apparatus of claim 24, wherein the processor computes attenuation values for a first quarter symbol and a final eight quarter symbols in each timeslot, when power is changing between adjacent timeslots in or across a frame.

26. The apparatus of claim 23, wherein if transmit power level is constant across the frame, processing time is about 11–14 msec.

27. The apparatus of claim 24, wherein the processor computes attenuation values for the first quarter symbol, the computed attenuation values being copied into all remaining quarter symbols in the frame, when power is constant across all timeslots in the frame.

28. The apparatus of claim 18, wherein the processor performs recursive copying by copying a first block of attenuation values stored in the buffer into an adjacent block in the buffer, thereby forming two identical blocks, and thereafter copying the two identical blocks into two adjacent blocks in the buffer.

29. The apparatus of claim 23, wherein if transmit power level varies between timeslots, processing time is about 38 msec.

30. The apparatus of claim 28, wherein copying is logarithmically repeated to copy twice the number of blocks of the previous copying step into an equal number of blocks in the successive copying step to fill the buffer.

* * * * *